United States Patent [19]

Sommer et al.

[11] Patent Number: 5,849,072
[45] Date of Patent: Dec. 15, 1998

[54] METAL PIGMENT DISPERSIONS, PROCESS FOR THE PRODUCTION THEREOF AND USE THEREOF

[75] Inventors: Günter Sommer, Kunigundenstrasse; Colin Appleyard, Kirchenweg, both of Germany

[73] Assignee: Eckart-Werke Standard-Bronzepulver-Werke, Germany

[21] Appl. No.: 553,396

[22] PCT Filed: Dec. 12, 1994

[86] PCT No.: PCT/DE94/00570

§ 371 Date: Feb. 15, 1996

§ 102(e) Date: Feb. 15, 1996

[87] PCT Pub. No.: WO94/28074

PCT Pub. Date: Dec. 8, 1995

[30] Foreign Application Priority Data

May 26, 1993 [DE] Germany .......................... 43 17 463.9

[51] Int. Cl.⁶ ...................................................... C09C 1/62
[52] U.S. Cl. ........................... 106/403; 106/404; 428/407
[58] Field of Search .................... 106/404, 403; 428/407

[56] References Cited

U.S. PATENT DOCUMENTS

| 3,244,542 | 4/1966 | Brown and Rolles | 106/277 |
|---|---|---|---|
| 3,389,105 | 6/1968 | Bolger | 523/205 |
| 4,138,270 | 2/1979 | Ishijima | 106/415 |
| 5,045,114 | 9/1991 | Bigalk | 106/404 |
| 5,156,677 | 10/1992 | Carpenter | 106/404 |
| 5,221,340 | 6/1993 | Nagase et al. | 106/403 |
| 5,466,286 | 11/1995 | Briselli et al. | 106/404 |
| 5,558,705 | 9/1996 | Keemer et al. | 106/404 |

FOREIGN PATENT DOCUMENTS

| 0134676 | 3/1985 | European Pat. Off. . |
| 4223384 | 1/1994 | Germany . |
| 1016893 | 1/1966 | United Kingdom . |
| 1535580 | 12/1978 | United Kingdom . |

*Primary Examiner*—Mark L. Bell
*Assistant Examiner*—Scott L. Hertzog
*Attorney, Agent, or Firm*—James A. Lucas

[57] ABSTRACT

Metal pigment dispersions are proposed, which comprise flake-form metal pigments produced by crushing and binding agent or binding agent solution which contain no or less than 0.01% by weight of reaction or decomposition products of fatty acids which result from the reaction with the metal pigment in the presence of oxygen in the air. Also described is a process for the production of those metal pigment dispersions, wherein the metal pigment is crushed with the binding agent in a ball crusher, and the use of those metal pigment dispersions for the production of paints or lacquers and inks, in particular printing inks.

36 Claims, No Drawings

METAL PIGMENT DISPERSIONS, PROCESS FOR THE PRODUCTION THEREOF AND USE THEREOF

The invention concerns metal pigment dispersions, a process for the production thereof and the use of those metal pigment dispersions for the production of paints or lacquers and inks, in particular printing inks.

Paints or lacquers and inks which contains flake-form metal pigments have a very wide range of uses. They are used in the paint industry as so-called metallic paints for painting motor vehicles, machines and the like. In the printing ink industry they are used for the production of printing inks for metallic and effect printing, but also for the surface coating of packaging materials using printing procedures in order thereby to replace the procedure of using metal foil for lining purposes, which is expensive in terms of This applies in particular for the packaging for foodstuffs and semi-luxury foods and tobacco.

Irrespective of the purpose of use thereof, the production of metal pigments is effected by coarse gravel-like powder, flakes or coarse pigments being ground in a plurality of steps until they are of the desired fineness or particle size. Thus for example aluminium, gold bronze, copper or zinc are reduced in size by crushing in a ball mill in the presence of hard round crushing bodies or by stamping. The crushing operation can be carried out wet, as for example when dealing with aluminium in the presence of white spirit, or dry, as for example when dealing with gold bronze or copper.

In the case of the wet crushing process the suspension which is obtained from the ball mill is pressed out on a filter press, giving a filter cake, for example in the case of aluminium, with a solvent content of about 20%. This filter cake must be dried to powder for use in many paints and printing inks, and frequently has to be made into a paste again with other solvents.

Metal pigments have a flake structure with a shape factor (ratio of diameter to thickness) of 10–500. It is only that particle shape that permits a metallic silver or gold effect, by virtue of the reflection characteristics. When crushing coarse powder, flakes or coarse pigments as the starting material, fresh surfaces are constantly produced. Accordingly in the crushing operation there is a need to add so-called crushing aids ('lubricants'). By virtue of the surface of the metal pigments being coated with lubricant and as a result of a reaction between the metal pigment surface and the lubricant, for example in the form of metal soap formation, that avoids cold welding or bonding and thus serious impairment of the optical effect of the metal particles. The crushing aids used are usually fatty acids or derivatives thereof, in the case of aluminium preferably stearic acid and oleic acid and, in the case of gold bronze and copper, preferably stearic acid. Those crushing aids also provide for control of the 'leafing' and 'non-leafing' properties of the pigments, which are again crucial in regard to the optical aspect and the adhesion of the pigments.

When crushing metal pigments when using fatty acids or derivatives thereof, undesirable fatty acid decomposition products also occur in the presence of oxygen from the air, besides the metal salts, in particular organic aldehydes and acids which adhere to the surface of the metal pigments and which cannot be removed with conventional processes. Furthermore, due to the above-mentioned decomposition products, for example butyric acid can also be formed, the metal pigments produced in that way have a typical unpleasant smell which is also present on the end product. It is precisely when those metal pigments are to be used in the foodstuffs area that this is not acceptable for sensory reasons.

In addition, when aluminium is subjected to wet crushing in the presence of white spirit as the crushing medium and a crushing aid such as for example oleic acid, the need to remove the white spirit also gives rise to further disadvantages. They are in particular that condensation and distillation wastes occur, as well as the fact that it is necessary to ensure that the waste slurries which are produced when the solvents are reprocessed are disposed of. The filter cake which is produced using the wet crushing process is only limitedly suitable for use in printing inks, because of the content of white spirit, so that it has to be dried to the form of powder, which involves additional expense, and frequently also at the same time with a deterioration in the pigment quality, and then it often has to be made into a paste again, with another solvent. The residues of white spirit which adhere to the pigment, even when thorough drying is effected, frequently make use thereof as a printing ink even impossible as, when applied, they not only cause an unpleasant smell but they can also adversely affect the properties of use.

U.S. Pat. No. 3,389,105 discloses a crushing process in which metal pigments are crushed in the presence of fluorohydrocarbon resins and a crushing aid, such as for example stearic acid. That crushing process can be carried out both dry and wet. In that process, the result obtained is a metal powder which is coated with a fluorohydrocarbon resin and which is problematical for reasons of environmental protection.

U.S. Pat. No. 5,045,114 discloses a similar process in which aluminium pigments coated with stearic acid are crushed with a thermoplastic resin or a thermosetting resin as a binding agent. The binding agent used is a material which is easily fluid at elevated temperatures and which then sets to give a definitive, smooth, regular form (thermosetting) or which hardens (thermoplastic). That aluminium pigment is used as a powder paint or lacquer and thus requires a special application technique.

In addition U.S. Pat. No 5,221,340 discloses a process in which an 'odor-free' metal pigment is achieved by a procedure whereby the pigment is crushed wet and then fused into a thermoplastic material. With that process, it is not possible to guarantee complete encapsulation of the metal pigments. In addition however only a part of the smelly lubricant components are evaporated at elevated temperature, in this expensive process.

Taking that known state of the art as the basic starting point, and the disadvantages that it entails, the object of the present invention is to provide a metal pigment dispersion which does not have any troublesome smells after use. The invention further seeks to provide a process which is simple to carry into effect and with which it is possible to avoid undesirable residues of the lubricant and undesirable chemical compounds of the lubricant with the metal pigment in order thereby to afford a greater degree of freedom in terms of processing of the dispersions, while in addition it is possible to avoid the use of white spirit which has hitherto been usual in the wet crushing procedure. German laid-open application (DE-OS) No 42 23 384 admittedly discloses a process in which the content of conventional lubricants can be reduced. That process however is very expensive, total removal of the lubricant is not possible, and the metal pigments produced in that way still suffer from the typical known smell whereas the process according to the invention can be easily and successfully carried into effect. In addition, the process according to the invention is intended to produce flake-form metal pigments which enjoy improved adhesion and thus a better lining capability and lamination capacity.

In accordance with the invention that object is attained in that the metal pigment is prepared in the form of a binding agent-bearing preparation which is free from lubricants or which has less than 0.01% by weight with respect to the metal pigment of reaction or decomposition products of fatty acids. The process is carried into effect in such a way that the metal pigment of a fine gravel-like material is crushed in a ball crusher in the presence of at least one binding agent or a binding agent solution with the addition of so much fatty acid or fatty acid derivatives that less than 0.01% by weight of reaction or decomposition products of fatty acids are produced, wherein the binding agent which is used in the end product serves as a crushing aid.

It has surprisingly been found that a large number of the materials conventionally used as binding agents in paints or lacquers and inks can perform the function of the crushing aid. Those binding agents can be selected from the group comprising alkyd, polyester, phenol (resol), urea, melamine, polyterpene, polyvinyl and polyvinyl chloride resins, polyacrylates, polymethacrylates, polystyrenes, polyolefins, coumarone-indene, hydrocarbon, ketone and aldehyde, aromatic-formaldehyde, carbamic acid and sulfonamide resins, cellulose derivatives, polyurethanes or epoxy resins, as well as natural oils, but none which can give off fatty acids or fatty acid derivatives. All those binding agents which are mixed with the metal pigment or the metal pigment pre-product in the production of inks and lacquers or paints in order to give the finished inks or the finished lacquer or paint perform the function of a lubricant as, when those binding agents are used, there can be a surface reaction between the reactive side groups of the binding agents and the metal pigment, but on the other hand there are no undesirable smelly decomposition products. Therefore cold welding or bonding of the metal pigments can be avoided in the crushing operation, and the risk of explosion in the manufacture of the aluminium pigments can be prevented without the use of white spirit or the like. Suitable solvents are alcohols, esters, aromatic substance-bearing, aromatic substance-free, aliphatic, cycloaliphatic and halogen-bearing hydrocarbons and aromatic substance-bearing, aromatic substance-free, aliphatic, cycloaliphatic, and purely aromatic high-boiling mineral oils. Due to the use of binding agent or binding agent solution in the crushing operation, the finished metal pigment dispersion already results from the production procedure for the metal pigments; prior to use (printing or painting), further additive agents such as for example a softener, further solvent and possibly further additives can be added to the metal pigment dispersion. The softeners used can be products based on phthalic acid, adipic and sebacic acid, phosphoric acid and chlorinated products. It is possible to use as further additives, emulsifiers, anti-settlement agents, anti-foam agents, lubricating agents, wetting agents, adhesion-improving agents and waxes such as for example PE-amide, PTFE and PP waxes. The choice of the corresponding binding agent or binding agent solution as a crushing aid and possibly further additives can therefore already be directed in the production process to the subsequent purpose of use of the metal pigment dispersion, whereby the production process and subsequent use are markedly simplified.

The process for the production of the metal pigment dispersion in accordance with the invention is preferably effected in such a way that the crushing procedure is performed in a ball crusher in which the metal pigment comprising a fine gravel-like powder, flake or coarse pigments of a grain size of less than 30 $\mu$m is crushed in the presence of at least one of the above-mentioned binding agents which also performs the function of the crushing aid, and possibly one of the above-mentioned solvents, with the addition of so much fatty acids and fatty acid derivatives that less than 0.01% by weight of decomposition products is produced. The proportion of binding agent in the metal pigment dispersion is from 20 to 90% by weight, that being clearly above the proportion of the lubricant which is usually added as a crushing aid and which is from 1 to 7% by weight.

The metal pigment dispersion produced in that way has no or less than 0.01% by weight with respect to the metal pigment of reaction or decomposition products of fatty acids, which arise out of the reaction with the metal pigment and adhere to the surface of the metal pigment. After the solvents have been pressed away and evaporated the end products do not have any annoying smells which could affect the senses, and the paints and inks produced afford excellent adhesion.

German patent specification No 41 35 095 admittedly discloses a process, in particular for the production of extremely small metal powders, in which the metal powders are crushed by means of small metal oxide balls, wherein the crushing operation can be carried out in that liquid in which the metal particles are to be suspended. Because of the different area of use and in particular the size (nm-range in comparison with the $\mu$m-range which is usual in the case of metal pigments) and nature of the metal particles, transferring the known process to the production of metal pigment dispersions of the present kind does not appear to be obvious.

Suitable metal pigments are aluminium, copper, zinc or an alloy of those metals. The metal pigment dispersion contains from 10 to 80% by weight metal pigment and from 90 to 20% by weight of binding agent solution. A metal pigment dispersion containing aluminium pigment comprises from 10 to 60% by weight, preferably from 40 to 60% by weight of aluminium pigment and from 90 to 40% by weight, preferably from 60 to 40% by weight of binding agent solution. A metal pigment dispersion containing copper pigment or gold bronze pigment consisting of a Cu/Zn-alloy comprises from 20 to 70% by weight, preferably from 40 to 60% by weight of gold bronze or copper pigment, and from 80 to 30% by weight, preferably from 60 to 40% by weight of binding agent solution. A metal pigment dispersion containing zinc pigment comprises from 10 to 80% by weight and preferably from 40 to 60% by weight of zinc pigment and from 90 to 20% by weight and preferably from 60 to 40% by weight of binding agent solution.

The present invention will now be described in greater detail with reference to Examples.

The components listed in the Examples are put into a ball crusher and crushed until the desired fineness of the metal pigment is reached.

In each case that results in an ink concentrate which, prior to the printing operation, must be adjusted to the required viscosity with a suitable solvent.

EXAMPLE 1

70% by weight of gravel-like brass powder (about 90% copper, about 10% zinc and less than 1% aluminium) <430 um 7.5% by weight of polyvinyl butyral (marketed under the name Pioloform BL 18 from the company Wacker of Burghausen)

18% by weight of ethanol 4.5% by weight of ethyl acetate.

The ink which can be obtained from the specified components has a good metallic effect in the doctor take-off skim. That skim is odor-free after the solvents have been pressed away and evaporated.

EXAMPLE 2

17% by weight of gravel-like aluminium powder<30 um
16% by weight of 70% colloidal wool AH27 (marketed by the company Hagedorn of Osnabruck)
53% by weight of ethanol
14% by weight of ethyl acetate.

The ink which can be obtained from those components has a good metallic effect in the doctor take-off skim. That skim is odor-free after the solvents have been pressed away and evaporated.

EXAMPLE 3

40% by weight of gravel-like brass powder (about 85% copper, about 15% zinc and less than 1% aluminium) <30 um
15% by weight of polyvinyl butyral (marketed under the name Pioloform BL 18 by the company Wacker of Burghausen)
36% by weight of ethanol
9% by weight of ethyl acetate.

The ink which can be obtained from those components has a good metallic effect in the doctor take-off skim. That skim is odor-free after the solvent has been pressed away and evaporated.

EXAMPLE 4

40% by weight of gravel-like brass powder (about 70% copper, about 30% zinc, and less than 1% aluminium) <30 um
50% by weight of aqueous acrylic resin dispersion with 35% solids content (marketed under the name Zinpol 146 by Zinchem, Somerset, N.J. USA)
10% by weight of water.

The ink which can be obtained from those components has a good metallic effect in the doctor take-off skim. That skim is odor-free after the solvent has been pressed away and evaporated.

We claim:

1. A process for the production of a flake metal dispersion for use in a paint, lacquer or ink, wherein the flake metal used in the dispersion is selected from the group consisting of aluminum, copper, zinc, and alloys thereof, said process comprising crushing between about 10% and about 80% by weight of a metal powder in the presence of between about 90% and about 20% by weight of at least one crushing aid selected from the group consisting of resins of alkyds, polyesters, polyvinyls, polyvinyl chlorides, polyacrylates, polymethacrylates, polystyrenes, coumarone-indenes, polyurethanes, cellulose derivatives, hydrocarbons, ketones, aldehydes, aromatic formaldehyde, and natural oils, and containing no fatty acids or derivatives of fatty acids, and no white spirits, wherein said crushing aid also serves as the binding agent for the paint, lacquer or ink.

2. A process according to claim 1 wherein the metal powder is of a grain size less than 30 microns.

3. The process according to claim 2 wherein the dispersion contains from 10 to 60% by weight of flake aluminum pigment and from 90 to 40% by weight of binding agent.

4. The process according to claim 3 wherein the dispersion contains from 40 to 60% by weight of flake aluminum pigment and from 60 to 40% by weight of the binding agent.

5. The process according to claim 1 wherein the dispersion contains between 20 and 70% by weight of a pigment selected from the group consisting of copper pigment and gold bronze pigment comprising a Cu/Zn alloy, and between 80 and 30% by weight of the binding agent.

6. The process according to claim 5 wherein said dispersion contains between 40 and 60% by weight of the pigment and between 60 and 40% by weight of the binding agent.

7. The process according to claim 1 wherein the dispersion contains between 10 and 80% by weight of zinc pigment and between 90 and 20% by weight of the binding agent.

8. The process according to claim 7 wherein the dispersion contains between 40 and 60% by weight of zinc pigment and between 60 and 40% by weight of the binding agent.

9. A process for the production of a flake metal dispersion for use in a paint, lacquer or ink, wherein the flake metal used in the dispersion is selected from the group consisting of aluminum, copper, zinc, and alloys thereof, said process comprising crushing between about 10% and about 80% by weight of a metal powder in the presence of between about 90% and about 20% by weight of a solution of at least one crushing aid selected from the group consisting of resins of alkyds, polyesters, polyvinyls, polyvinyl chlorides, polyacrylates, polymethacrylates, polystyrenes, coumarone-indenes, polyurethanes, cellulose derivatives, hydrocarbons, ketones, aldehydes, aromatic formaldehyde, and natural oils, and containing no fatty acids or derivatives of fatty acids, and no white spirits, wherein the dissolved crushing aid solution also serves at least in part as the binding agent solution for the paint, lacquer or ink.

10. The process according to claim 9 wherein the binding agent solution contains at least one solvent selected from the group consisting of alcohols, esters, aromatic substance-bearing, aromatic-substance-free, aliphatic, cycloaliphatic and halogen-bearing hydrocarbons, aromatic substance-bearing, aromatic substance-free, aliphatic, cycloaliphatic, and purely aromatic high boiling mineral oils, and water.

11. The process according to claim 10 wherein the metal powder is of a grain size less than 30 microns.

12. The process according to claim 10 wherein the pigment dispersion contains between 10 and 60% by weight of flake aluminum pigment and between 90 and 40% by weight of the binding agent solution.

13. The process according to claim 10 wherein the pigment dispersion contains between 40 and 60% by weight of flake aluminum pigment and between 60 and 40% by weight of the binding agent solution.

14. The process according to claim 10 wherein the pigment dispersion contains between 10 and 80% by weight of zinc pigment, and between 90 and 20% by weight of the binding agent solution.

15. The process according to claim 14 wherein the pigment dispersion contains between 40 and 60% by weight of zinc pigment, and between 60 and 40% by weight of the binding agent solution.

16. The process according to claim 10 wherein the pigment dispersion contains between 20 and 70% by weight of a pigment selected from the group consisting of copper pigment and gold bronze pigment comprising a Cu/Zn alloy, and between 80 and 30% by weight of binding agent solution.

17. The process according to claim 16 wherein said dispersion contains between 60 and 40% by weight of the pigment and between 40 and 60% by weight of the binding agent solution.

18. A dispersion of a metal pigment selected from the group consisting of aluminum, copper, zinc, and alloys thereof, for use in a paint, lacquer, or ink, said dispersion produced by crushing between 10% and 80% by weight of a metal powder having a particle size less than 30 microns, in the presence of between 90% and 20% by weight of at least one crushing aid selected from the group consisting of resins of alkyds, polyesters, polyvinyls, polyvinyl chlorides, polyacrylates, polymethacrylates, polystyrenes, coumarone-indenes, polyurethanes, cellulose derivatives, hydrocarbons, ketones, aldehydes, aromatic formaldehyde, and natural oils, and said dispersion containing less than 0.01% by weight of decomposition products of fatty acids or fatty acid derivatives which might be smell-forming reaction products and no residues of white spirits.

19. The dispersion according to claim 18 wherein the binding agent comprises a non volatile component of the paint, lacquer or ink.

20. The metal pigment dispersion according to claim 18 wherein the dispersion contains flake aluminum pigment in an amount of between 10 and 60% by weight and the binding agent in an amount of between 90 and 40% by weight.

21. The dispersion according to claim 20 wherein the dispersion contains flake aluminum pigment in an amount of between 40 and 60% by weight and the binding agent in an amount of between 60 and 40% by weight.

22. The dispersion according to claim 18 wherein the dispersion contains zinc pigment in an amount between 10 and 80% by weight and a binding agent in an amount between 90 and 20% by weight.

23. The dispersion according to claim 22 wherein the dispersion contains the zinc pigment in an amount of between 40 and 60% by weight and a binding agent in an amount of between 60 and 40% by weight.

24. The dispersion according to claim 18 wherein the dispersion contains between 20 and 70% by weight of a pigment selected from the group consisting of copper pigment and gold bronze pigment comprising a Cu/Zn-alloy, and between 80 and 30% by weight of the binding agent.

25. The dispersion according to claim 24 wherein said dispersion contains between 40 and 60% by weight of the pigment and between 60 and 40% by weight of the binding agent.

26. A dispersion of a metal pigment selected from the group consisting of aluminum, copper, zinc, and alloys thereof, for use in a paint, lacquer, or ink, said dispersion produced by crushing between 10% and 80% by weight of a metal powder having a particle size less than 30 microns, in the presence of between 90% and 20% by weight of a solution of at least one crushing aid selected from the group consisting of resins of alkyds, polyesters, polyvinyls, polyvinyl chlorides, polyacrylates, polymethacrylates, polystyrenes, coumarone-indenes, polyurethanes, cellulose derivatives, hydrocarbons, ketones, aldehydes, aromatic formaldehyde, and natural oils wherein the crushing aid serves as a binding agent for the paint, lacquer or ink, said dispersion containing less than 0.01% by weight of decomposition products of fatty acids or fatty acid derivatives which might be smell-forming reaction products, and no residues of white spirits.

27. A dispersion of a metal pigment according to claim 26 wherein the binding agent is a solution in at least one solvent selected from the group consisting of alcohols, esters, aromatic substance-bearing, aromatic-substance-free, aliphatic, cycloaliphatic and halogen-bearing hydrocarbons, aromatic substance-bearing, aromatic substance-free, aliphatic, cycloaliphatic, and purely aromatic high boiling mineral oils, and water.

28. The metal pigment dispersion according to claim 27, wherein the dispersion contains between 10 and 60% by weight of flake aluminum pigment and between 90 and 40% by weight of the binding agent solution.

29. The metal pigment dispersion according to claim 28, wherein the dispersion contains the flake aluminum pigment in an amount of between 40 and 60% by weight and the binding agent solution in an amount of between 60 and 40% by weight.

30. The dispersion according to claim 27, wherein the dispersion contains zinc pigment in an amount between 10 and 80% by weight and a binding agent solution in an amount between 90 and 20% by weight.

31. The dispersion according to claim 30 wherein the dispersion contains zinc pigment in an amount of between 40 and 60% by weight and the binding agent solution in an amount of between 60 and 40% by weight.

32. The dispersion according to claim 27 wherein the dispersion contains between 10 and 80% by weight of a pigment selected from the group consisting of copper pigment and gold bronze pigment comprising a Cu/Zn-alloy, and between 90 and 20% by weight of the binding agent solution.

33. The dispersion according to claim 32 wherein the dispersion contains between 40% and 60% by weight of the pigment and between 60 and 40% by weight of the binding agent solution.

34. The process for avoiding offensive odors in flake metal dispersions useful for paints, lacquers and inks, wherein a flake metal is produced by crushing a powder of a metal selected from the group consisting of aluminum, copper, zinc and alloys thereof in the presence of a crushing aid, but in the absence of fatty acids or fatty acid derivatives which would result in the formation of a decomposition product in an amount greater than 0.01% by weight in the dispersion, the crushing aid also serving as a binding agent for the flake metal in the paints, lacquers or inks.

35. The process according to claim 34 wherein the crushing is carried out in the absence of white spirits.

36. The process according to claim 35 wherein the crushing aid is selected from the group consisting of resins of alkyds, polyesters, polyvinyls, polyvinyl chlorides, polyacrylates, polymethacrylates, polystyrenes, coumarone-indenes, polyurethanes, cellulose derivatives, hydrocarbons, ketones, aldehydes, aromatic formaldehyde, and natural oils.

* * * * *